(12) United States Patent
Galpin et al.

(10) Patent No.: US 12,149,731 B2
(45) Date of Patent: Nov. 19, 2024

(54) UNIFIED PROCESS AND SYNTAX FOR GENERALIZED PREDICTION IN VIDEO CODING/DECODING

(71) Applicant: INTERDIGITAL MADISON PATENT HOLDINGS, SAS, Paris (FR)

(72) Inventors: Franck Galpin, Thorigne-Fouillard (FR); Antoine Robert, Mézières sur Couesnon (FR); Tangi Poirier, Thorigné-Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/100,667

(22) Filed: Jan. 24, 2023

(65) Prior Publication Data
US 2023/0232037 A1    Jul. 20, 2023

Related U.S. Application Data

(63) Continuation of application No. 17/289,076, filed as application No. PCT/US2019/062175 on Nov. 19, 2019.

(30) Foreign Application Priority Data

Nov. 30, 2018   (EP) .................. 18306592.9

(51) Int. Cl.
*H04N 19/52*        (2014.01)
*H04N 19/107*       (2014.01)
(Continued)

(52) U.S. Cl.
CPC .......... *H04N 19/52* (2014.11); *H04N 19/107* (2014.11); *H04N 19/132* (2014.11);
(Continued)

(58) Field of Classification Search
CPC .... H04N 19/593; H04N 19/159; H04N 19/70; H04N 19/105; H04N 19/139;
(Continued)

(56) References Cited

U.S. PATENT DOCUMENTS

2011/0142132 A1   6/2011  Tourapis et al.
2016/0142729 A1   5/2016  Wang et al.
(Continued)

FOREIGN PATENT DOCUMENTS

CN    102113326 A    6/2011
CN    105493505 A    4/2016
(Continued)

OTHER PUBLICATIONS

Chen, et al., Algorithm Description for Versatile Video Coding and Test Model 2 (VTM 2), Joint Video Experts Team (JVET) of ITU-T SG 16 WP 3 and ISO/IEC JTC 1/SC 29/WG11; Editors; 11th Meeting: Ljubljana, SI; JVET-K1002-V2, Jul. 10-18, 2018, 21 pages.
(Continued)

*Primary Examiner* — Neil R Mikeska
(74) *Attorney, Agent, or Firm* — Condo Roccia Koptiw LLP

(57) ABSTRACT

At least a method and an apparatus are provided for efficiently encoding or decoding video. For example, a plurality of different motion prediction modes are obtained for a current block. The current block is encoded or decoded based on a combination of the plurality of different motion prediction modes with corresponding weights, wherein the combination with the corresponding weights comprising at least two inter prediction modes, or an inter prediction mode and an intra prediction mode. Both triangle prediction and multi-hypothesis prediction are allowed to be indicated in one or more lists of possible motion vector candidates, such (Continued)

as, e.g., in advanced motion vector prediction (AMVP) mode.

24 Claims, 15 Drawing Sheets

(51) Int. Cl.
    *H04N 19/132*     (2014.01)
    *H04N 19/139*     (2014.01)
    *H04N 19/176*     (2014.01)
    *H04N 19/593*     (2014.01)
    *H04N 19/70*     (2014.01)

(52) U.S. Cl.
CPC ......... *H04N 19/139* (2014.11); *H04N 19/176* (2014.11); *H04N 19/593* (2014.11); *H04N 19/70* (2014.11)

(58) Field of Classification Search
CPC .. H04N 19/107; H04N 19/176; H04N 19/119; H04N 19/132; H04N 19/52
See application file for complete search history.

(56) References Cited

U.S. PATENT DOCUMENTS

| | | | |
|---|---|---|---|
| 2017/0142418 A1 | 5/2017 | Li et al. | |
| 2018/0070101 A1* | 3/2018 | Suzuki | H04N 19/52 |
| 2018/0278932 A1* | 9/2018 | Mukherjee | H04N 19/115 |
| 2018/0302642 A1* | 10/2018 | Schwarz | H04N 19/103 |
| 2019/0037213 A1* | 1/2019 | Hermansson | H04N 19/157 |
| 2019/0149821 A1* | 5/2019 | Moon | H04N 19/105 375/240.02 |
| 2022/0014778 A1 | 1/2022 | Galpin et al. | |
| 2023/0254502 A1* | 8/2023 | Zhao | H04N 19/52 375/240.02 |

FOREIGN PATENT DOCUMENTS

| | | |
|---|---|---|
| EP | 382048 A1 | 5/2021 |
| EP | 3820148 A1 | 5/2021 |
| JP | 2003-032687 A | 1/2003 |
| WO | 2010/017166 A2 | 2/2010 |
| WO | 2015/010319 A1 | 1/2015 |
| WO | 2016/034058 A1 | 3/2016 |

OTHER PUBLICATIONS

Chen, et al., Generalized Bi-Prediction for Inter Coding, JVET-C0047, InterDigital Communications, Inc., Joint Video Exploration Team (JVET) of ITU-T SG 16 WP 3 and ISO/IEC JTC 1/SC 29/WG 11, 3rd Meeting: Geneva, CH, May 26-Jun. 1, 2016, 4 pages.

Chiang, et al., CE10.1: Combined and Multi-Hypothesis Prediction, JVET-K0257-V1, MediaTek Inc., Joint Video Expe1is Team (JVET) of ITU-T SG 16 WP3 and ISO/IEC JTC 1/SC 29/WG 11, 11th Meeting Ljubljana, Slovenia, Jul. 10-18, 2018, 6 pages.

Chiang, et al., CE10.1: Combined and Multi-Hypothesis Prediction for Improving AMVP Mode, Skip or Merge Mode, and Intra Mode, JVET-L0100-V3, MediaTek Inc., Joint Video Experts Team (JVET) of ITU-T SG 16 WP 3 and ISO/IED JTC 1/SC 29/WG 11, 12th Meeting, Macao, China, Oct. 3, 2018, 14 pages.

Hsu, et al., Description of Core Experiment 10: Combined and Multi-Hypothesis Prediction, JVET-L1030-V2, CE Coordinators, Joint Video Experts Team (JVET) of ITU-T SG 16 WP3 and ISO/IEC JTC 1/SC 29/WG 11, 12th Meeting: Macao, CN, Oct. 3-12, 2018, 12 pages.

ISO/IEC, Information Technology—Generic Coding of Moving Pictures and Associated Audio Information: Video, ISO 13818-2: 1995 (E), Recommendation ITU-T H.262, International Organization for Standardization (ISO) and the International Electrotechnical Commission (IEC), International Standard 13818-2, Jul. 1995, 211 pages.

ITU-T, Information Technology—Generic Coding of Moving Pictures and Associated Audio Information: Systems, H.222.0, Series H: Audiovisual and Multimedia Systems, Infrastructure of Audiovisual Services-Transmission Multiplexing and Synchronization, Jun. 2012, 228 pages.

ITU-T, Reference Software for ITU-T H.265 High Efficiency Video Coding, Recommendation ITU-T H.265.2, Series H: Audiovisual and Multimedia Systems, Infrastructure of Audiovisual Services—Coding of Moving Video, Oct. 2014, 12 pages.

Liao, et al., CE10 Related: Combining Multi-Hypothesis Prediction with Triangular Prediction Unit Mode, JVET-K0148-V2, Panasonic, Joint Video Exploration Team (JVET) of ITU-T SG 16 WP 3 and ISO/IEC JTC 1/SC 29/WG 11, 11th Meeting: Ljubljana, SI, Jul. 10-18, 2018, 4 pages.

Liao, et al., CE10: Triangular Prediction Unit Mode (CE10.3.1 and CE10.3.2), JVET-K0144-V2, Joint Video Exploration Team (JVET) of ITU-T SG16 WP3 and ISO/IEC JTC 1/SC 29/WG 11, 11th Meeting Ljubljana, Slovenia, Jul. 10, 2018, 6 pages.

Poirier, et al., CE10-Related: Multiple Prediction Unit Shapes, JVET-L0208-V1, Joint Video Experts Team (JVET) of ITU-T SG16 WP3 and ISO/IEC JTC 1/SC 29/WG 11, 12th Meeting: Macao, China, Oct. 3, 2018, 6 pages.

\* cited by examiner

UNIFIED PROCESS AND SYNTAX FOR GENERALIZED PREDICTION IN VIDEO CODING/DECODING

CROSS-REFERENCE TO RELATED APPLICATIONS

This application is a continuation of U.S. patent application Ser. No. 17/289,076, which is the National Stage Entry under 35 U.S.C. § 371 of Patent Cooperation Treaty Application No. PCT/US2019/062175, filed Nov. 19, 2019, which claims priority from European Patent Application No. 18306592.9, filed Nov. 30, 2018, the entire contents of each of which are hereby incorporated by reference herein.

TECHNICAL FIELD

At least one of the present embodiments generally relates to a method or an apparatus for video encoding or decoding, and more particularly, to a method or an apparatus for efficiently providing video compression and/or decompression with a unified process and a unified syntax for generalized prediction and/or one more related processes.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transformation, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

SUMMARY

The drawbacks and disadvantages of the prior art are solved and addressed by one or more aspects described in this application.

According to an embodiment, a method for video encoding is provided, comprising: obtaining a plurality of different motion prediction modes for a current block; encoding the current block based on a combination of the plurality of different motion prediction modes with corresponding weights, wherein the combination with the corresponding weights comprising at least two inter prediction modes, or an inter prediction mode and an intra prediction mode; and both triangle prediction and multi-hypothesis prediction are allowed to be indicated in one or more lists of possible motion vector candidates.

According to another embodiment, a method for video decoding is provided, comprising: obtaining a plurality of different motion prediction modes for a current block; decoding the current block based on a combination of the plurality of different motion prediction modes with corresponding weights, wherein the combination with the corresponding weights comprising at least two inter prediction modes, or an inter prediction mode and an intra prediction mode; and both triangle prediction and multi-hypothesis prediction are allowed to be indicated in one or more lists of possible motion vector candidates.

According to another embodiment, an apparatus for video encoding is provided, comprising: means for obtaining a plurality of different motion prediction modes for a current block; means for encoding the current block based on a combination of the plurality of different motion prediction modes with corresponding weights, wherein the combination with the corresponding weights comprising at least two inter prediction modes, or an inter prediction mode and an intra prediction mode; and both triangle prediction and multi-hypothesis prediction are allowed to be indicated in one or more lists of possible motion vector candidates.

According to another embodiment, an apparatus for video decoding is provided, comprising: means for obtaining a plurality of different motion prediction modes for a current block; means for decoding the current block based on a combination of the plurality of different motion prediction modes with corresponding weights, wherein the combination with the corresponding weights comprising at least two inter prediction modes, or an inter prediction mode and an intra prediction mode; and both triangle prediction and multi-hypothesis prediction are allowed to be indicated in one or more lists of possible motion vector candidates.

According to another embodiment, an apparatus for video encoding is presented, comprising one or more processors, wherein said one or more processors are configured to: obtain a plurality of different motion prediction modes for a current block; encode the current block based on a combination of the plurality of different motion prediction modes with corresponding weights, wherein the combination with the corresponding weights comprising at least two inter prediction modes, or an inter prediction mode and an intra prediction mode; and both triangle prediction and multi-hypothesis prediction are allowed to be indicated in one or more lists of possible motion vector candidates.

According to another embodiment, an apparatus for video decoding is presented, comprising one or more processors, wherein said one or more processors are configured to: obtain a plurality of different motion prediction modes for a current block; decode the current block based on a combination of the plurality of different motion prediction modes with corresponding weights, wherein the combination with the corresponding weights comprising at least two inter prediction modes, or an inter prediction mode and an intra prediction mode; and both triangle prediction and multi-hypothesis prediction are allowed to be indicated in one or more lists of possible motion vector candidates.

According to another embodiment, a signal comprising encoded video is formed by: obtaining a plurality of different motion prediction modes for a current block; encoding the current block based on a combination of the plurality of different motion prediction modes with corresponding weights, wherein the combination with the corresponding weights comprising at least two inter prediction modes, or an inter prediction mode and an intra prediction mode; and forming the bitstream comprising the encoded current block; and both triangle prediction and multi-hypothesis prediction are allowed to be indicated in one or more lists of possible motion vector candidates.

According to another embodiment, the obtaining of the plurality of different motion prediction modes is based on processing of a unified syntax comprising the plurality of different motion prediction modes and a first flag indicating whether the current block is a bi-prediction.

According to another embodiment, the current block is partitioned into two triangular sub-blocks, each with its own motion vector predictor.

According to another embodiment, one or more motion vector predictors for a diagonal boundary between the two triangular sub-blocks are obtained based on the blending of the motion vector predictors of the two triangular sub-blocks.

According to another embodiment, when the combination with the corresponding weights comprising at least an inter prediction mode and an intra prediction mode, the corresponding weights depend on an intra direction of the intra prediction mode.

According to another embodiment, the corresponding weights further depend on a distance between a current sample of the current block and an intra reference sample of the intra prediction mode.

According to another embodiment, the corresponding weights decrease with the distance increases.

According to another embodiment, the corresponding weights are applied via one or more masks.

According to another embodiment, the one or more masks are applied using a shifting process.

DETAILED DESCRIPTION

For clarity of description, the following description will describe aspects with reference to embodiments involving video compression technology such as, for example, HEVC, JEM and/or H.266. However, the described aspects are applicable to other video processing technologies and standards.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
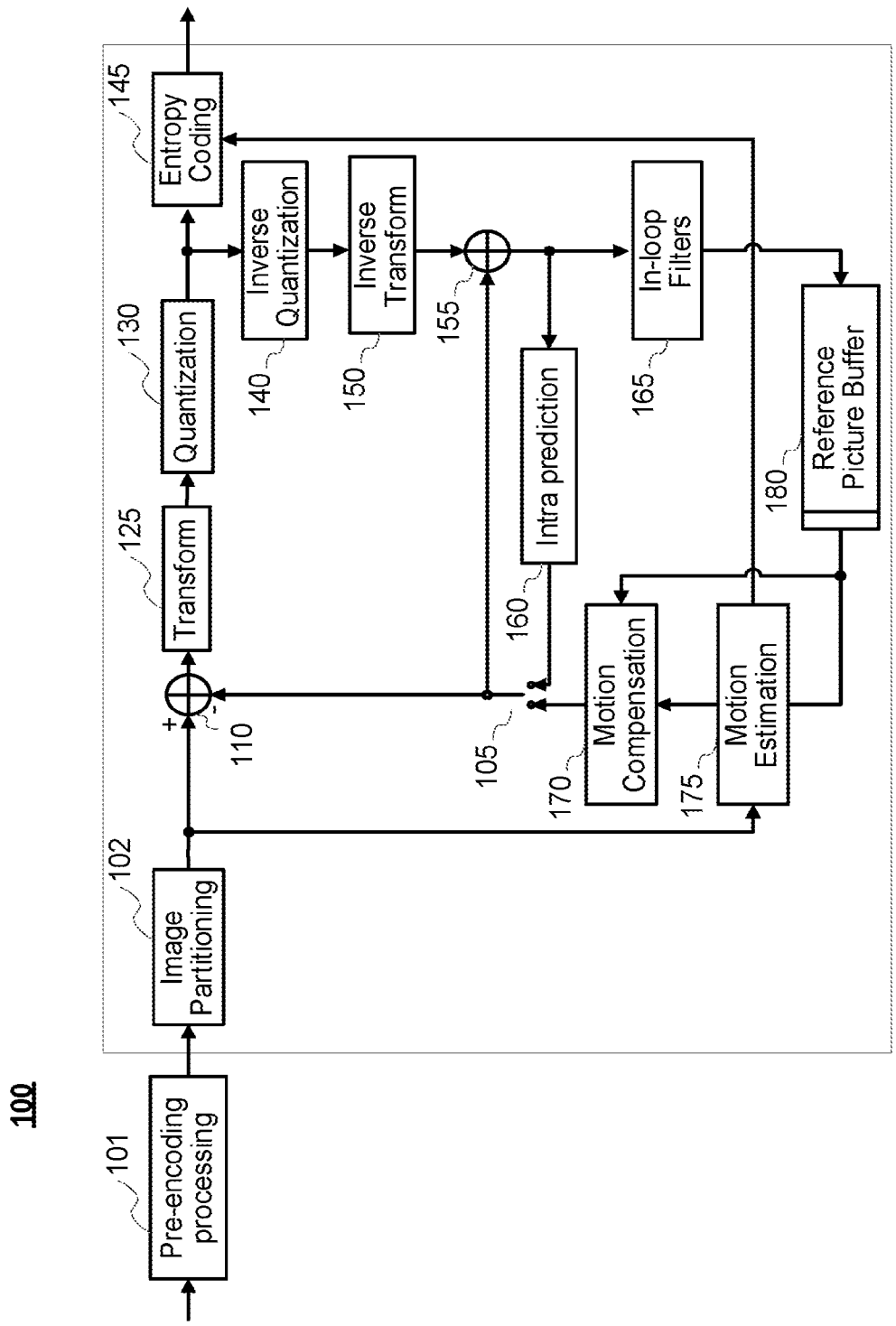
FIG. 1 illustrates a block diagram of an embodiment of a video encoder.
Figure 2:
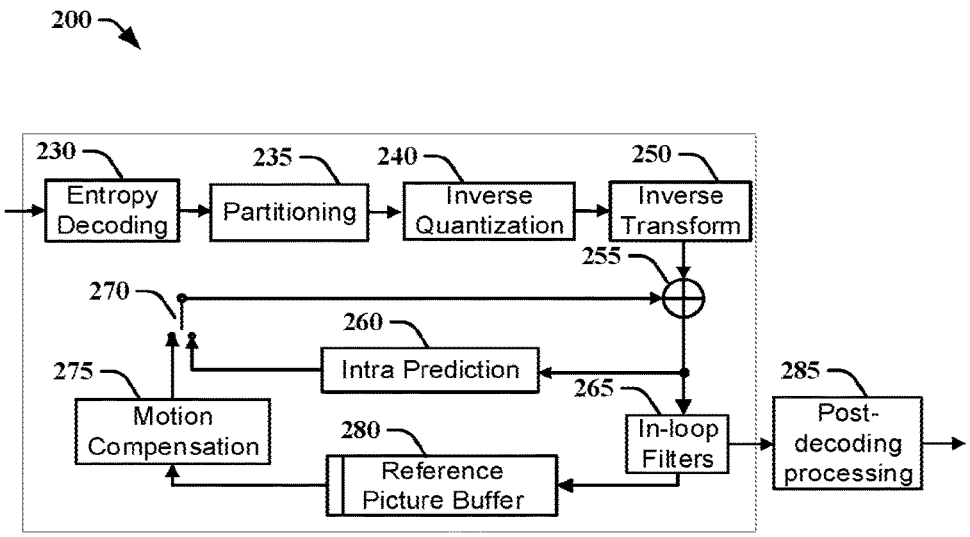
FIG. 2 illustrates a block diagram of an embodiment of a video decoder.
Figure 3:
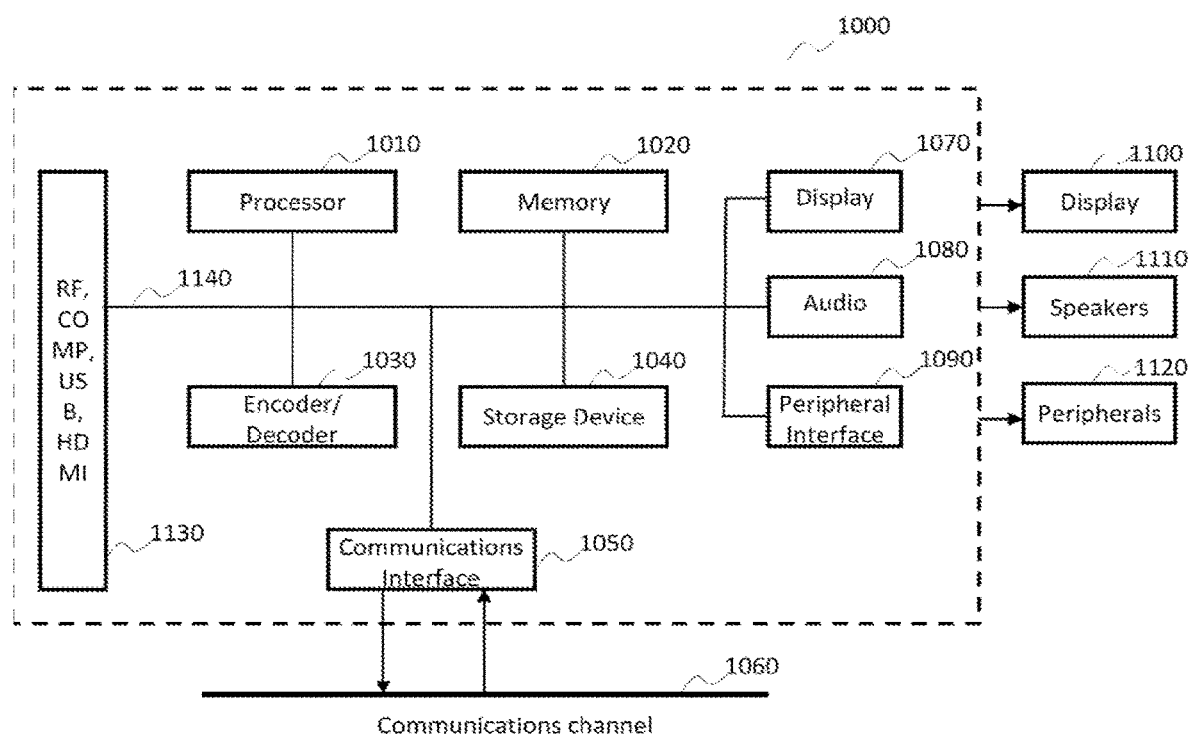
FIG. 3 illustrates a block diagram of a system within which aspects of the present embodiments may be implemented.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIGS. 1 and 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example regarding block sizes. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data. In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

Figure 10:
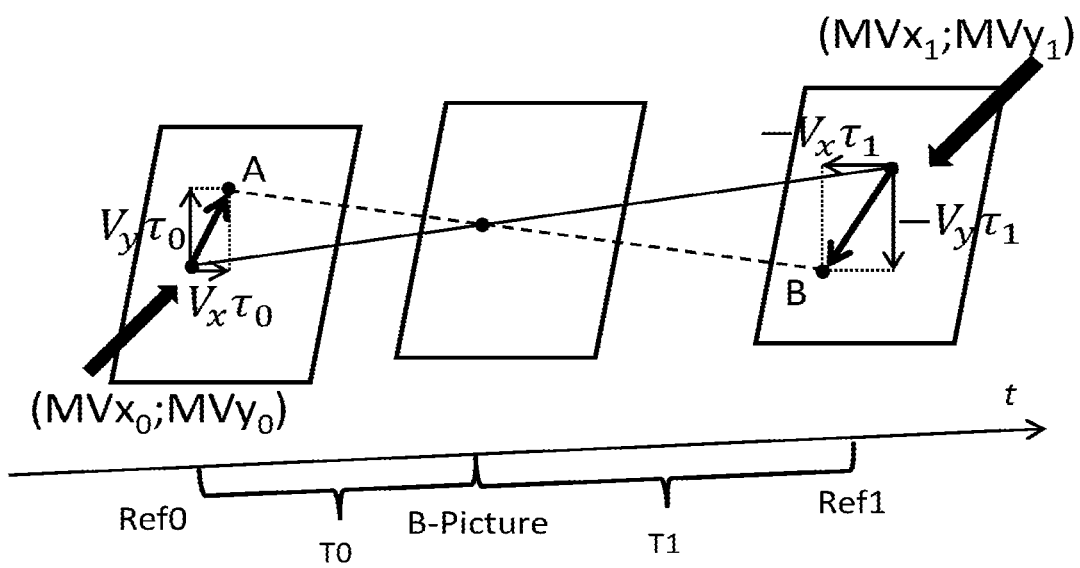
FIG. 10 illustrates an optical flow trajectory.

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna. Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The encoder 100 of FIG. 1, decoder 200 of FIG. 2 and system 1000 of FIG. 3 are adapted to implement at least one of the embodiments described below.

Figure 4:
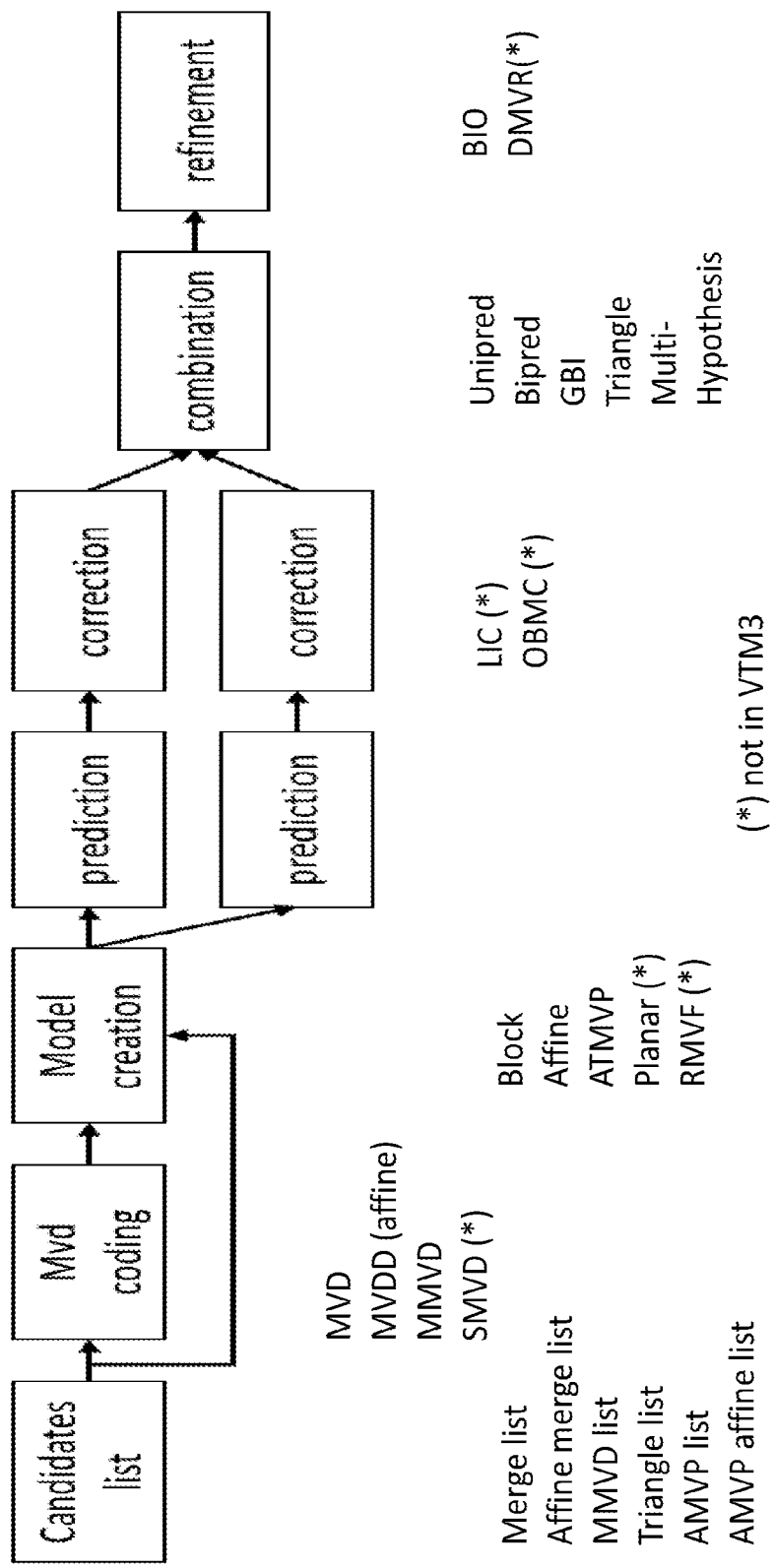
FIG. 4 illustrates an overview of an inter prediction process.

Video encoding and decoding may use different tools for the inter prediction. FIG. 4 shows an overview of the inter prediction process, with associated tools at each stage of the pipeline.

The following paragraphs describe some of these inter prediction tools and their additional aspects.

Extensions of the bi-prediction of HEVC are proposed in the combination stage of the pipeline, and later called combination tools: uni-prediction, similar to the HEVC uni-prediction, Bi-prediction: similar to the HEVC bi-prediction, triangular prediction (TRIANGLE), multi-hypothesis (MH), and generalized bi-prediction (GBi).

Figure 5:
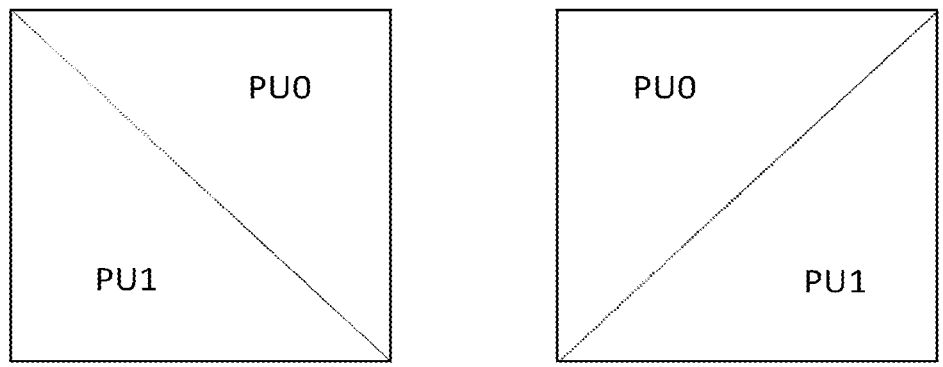
FIG. 5 illustrates splitting of a CU into two triangular prediction units.

TRIANGLE is a prediction composed of 2 predictions, but instead of a simple blending, each prediction will cover a part of the PU. The boundaries between the two predictions are blended. As shown in FIG. 5, a Coding Unit (CU) is split into two triangular Prediction Units (PUs), either in diagonal or inverse diagonal direction. Each triangular Prediction Unit in the CU is inter-predicted using its own motion vector and reference frame index which are derived from a merge candidate list.

An adaptive weighting process is applied to the prediction samples of the diagonal or the inverse diagonal edge between the two triangular Prediction Units to derive the final prediction samples values for the whole CU, as shown in FIG. 5.

The triangular Prediction Unit mode is only applied to CUs in skip or merge mode. When the triangular Prediction Unit mode is applied to the CU, an index (triangle_merge_idx) indicating the direction of splitting the CU into two triangular Prediction Units, plus the motion vectors of the two triangular Prediction Units, are signaled. The partitions can be generalized to other partitions shape.

Multi-hypothesis mode combines a regular inter prediction and an intra prediction together to form a block prediction. The blending between the 2 predictions depends of the intra direction. More precisely, Multi-hypothesis combines an inter prediction performed in merge mode (merge index is signaled to derive the motion information used for the motion compensated prediction) with an intra prediction mode or with another inter mode (e.g. uni-prediction advanced motion vector prediction (AMVP), skip or merge). The final prediction is the weighted average of the merge indexed prediction and the prediction generated by the intra prediction mode, where different weights are applied depending on the intra direction and the distance between the current sample and intra reference sample. The intra prediction mode is signaled (it can be a subset (e.g., 4) of the complete set of prediction modes).

Figures 7, 8:
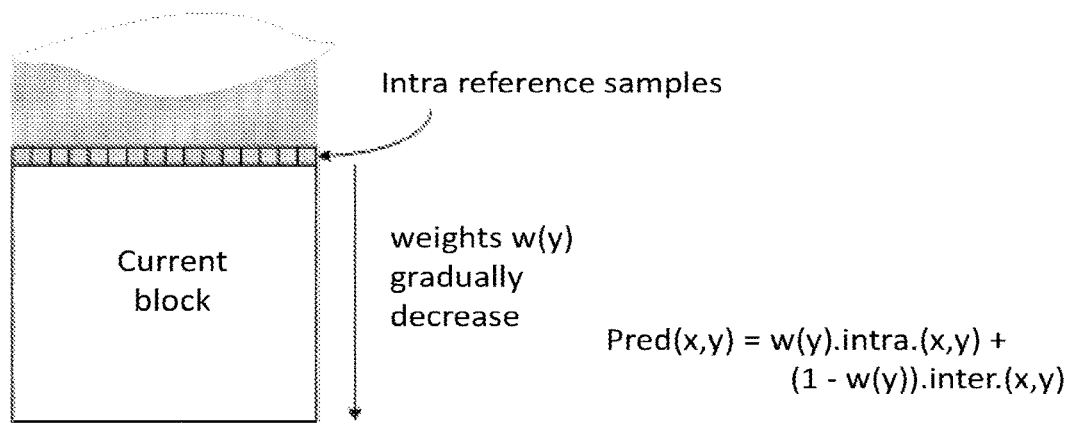
FIG. 7 illustrates a multi-hypothesis prediction in case of inter mode and intra mode combination.
FIG. 8 illustrates intra prediction regions and their corresponding weights in multi hypothesis mode.

As illustrated in FIG. 8, a current block is split into 4 equal-area regions. The weights gradually decrease as the region is far from the intra reference samples. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region, as depicted in an example in FIG. 7 for intra vertical direction prediction. When DC or planar mode is selected, or the CU width or height is smaller than 4, equal weights are applied for all samples. In intra prediction in multi hypothesis CUs, chroma components use direct mode (same intra direction as luma).

Figure 9:
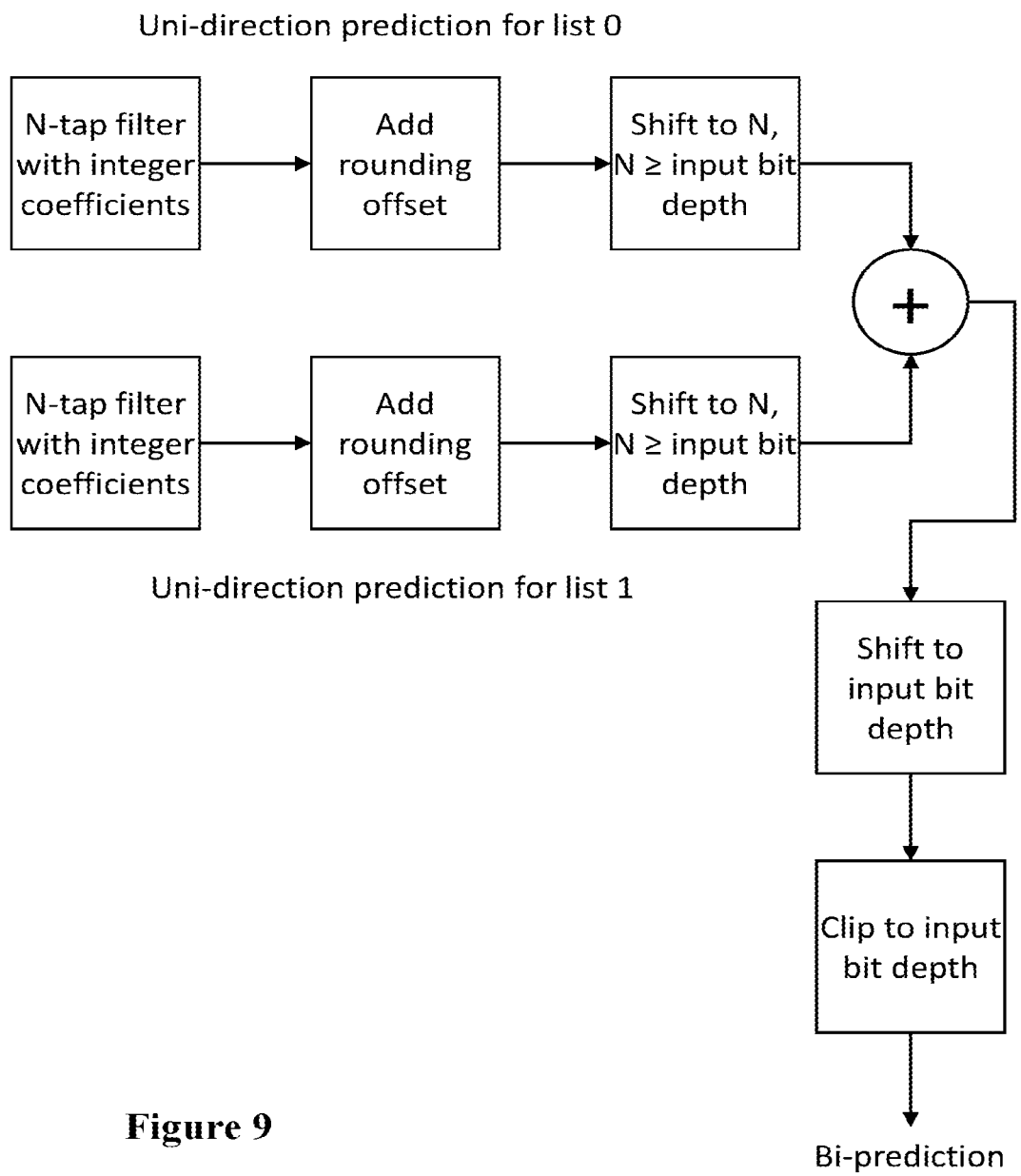
FIG. 9 illustrates a bi-prediction process in HEVC.

A generalized bi-prediction (GBi) mode predicts a block by combining two motion-compensated prediction blocks using block-level adaptive weights from a pre-defined set of candidate weights. As such, the prediction process of GBi can reuse the existing logics of weighted prediction, and no extra decoding burden is introduced. In HEVC, the averaging of 2 uni-directional prediction signals for bi-prediction is done at a higher precision than either the input or internal bit depth as shown in FIG. 9.

The bi-prediction formula is shown in Equation 1, where offset and shift are used to normalize the final predictor to the input bit depth.

$$P_{bidir} = ((1-w_1) * (P_{L0} + w_1 * P_{L1} + \text{offset})) \gg \text{shift} \quad \text{Equation 1}$$

As there is no rounding in intermediate stages, HEVC interpolation filter allows certain implementation optimizations.

Multiple weights can be used for averaging 2 uni-directional prediction to get a bi-directional prediction. Typically, the weights used are {−¼, 5/4}, {3/8, 5/8} or {½, ½} (as in HEVC), and the bi-prediction formula is modified as in Equation 2. Only one weight is used for the entire block.

$$P_{bidir} = ((1-w_1) * P_{L0} + w_1 * P_{L1} + \text{offset}) \gg \text{shift} \quad \text{Equation 2}$$

Another tool is Bi-directional Optical flow (BIO), a sample-wise motion refinement which is performed on top of block-wise motion compensation for bi-prediction. The sample-level motion refinement does not use signaling. In case of bi-prediction, the goal of BIO is to refine motion for each sample assuming linear displacement in-between the two reference pictures and based on Hermite's interpolation of the optical flow as show in FIG. 10.

Figure 11A:
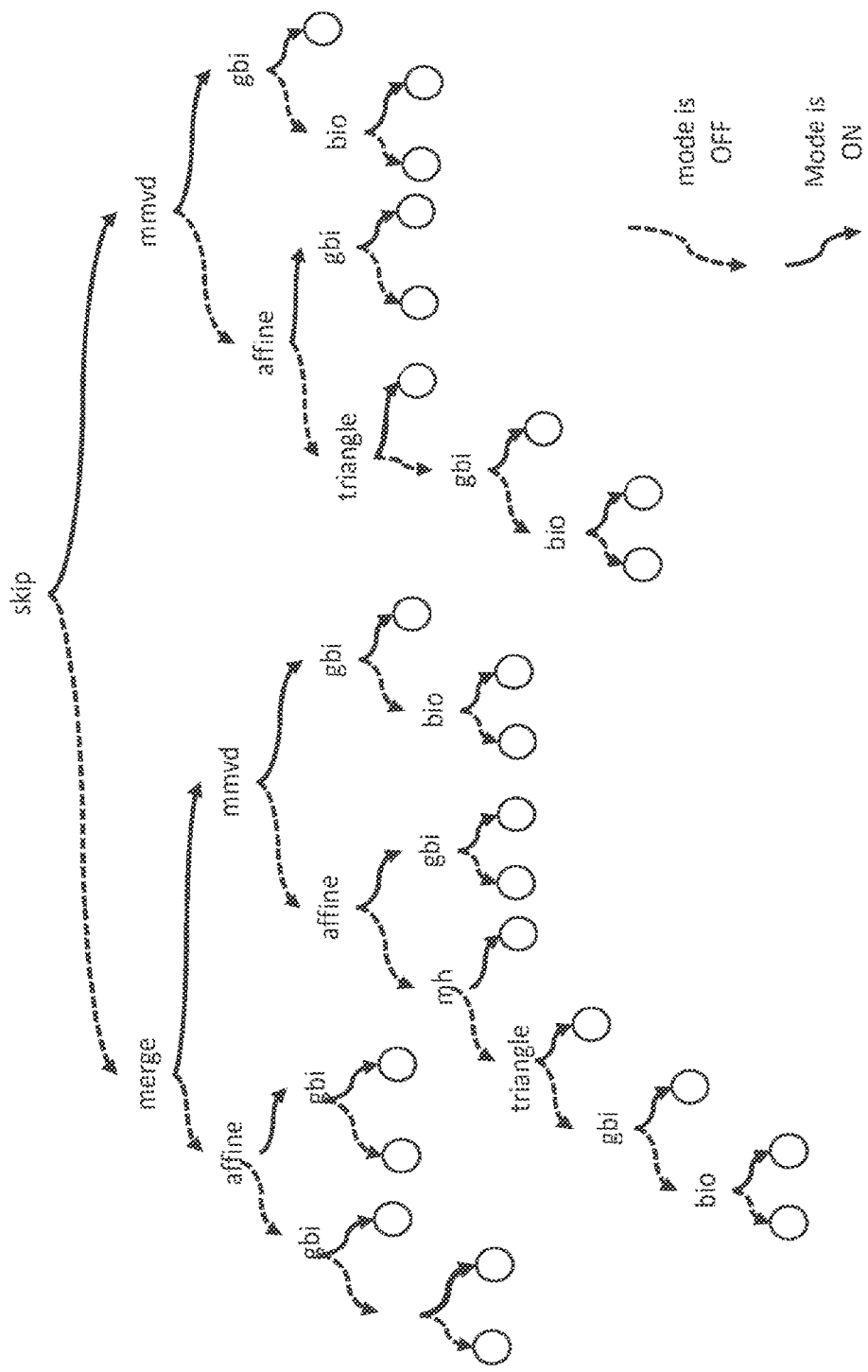
FIG. 11A illustrates a compatibility tree.

However, these inter prediction tools are currently exclusive and not always available in all possible coding modes (skip/merge/AMVP) as shown in FIG. 11. This makes the coding less efficient and the syntax more complex.

Figure 11B:
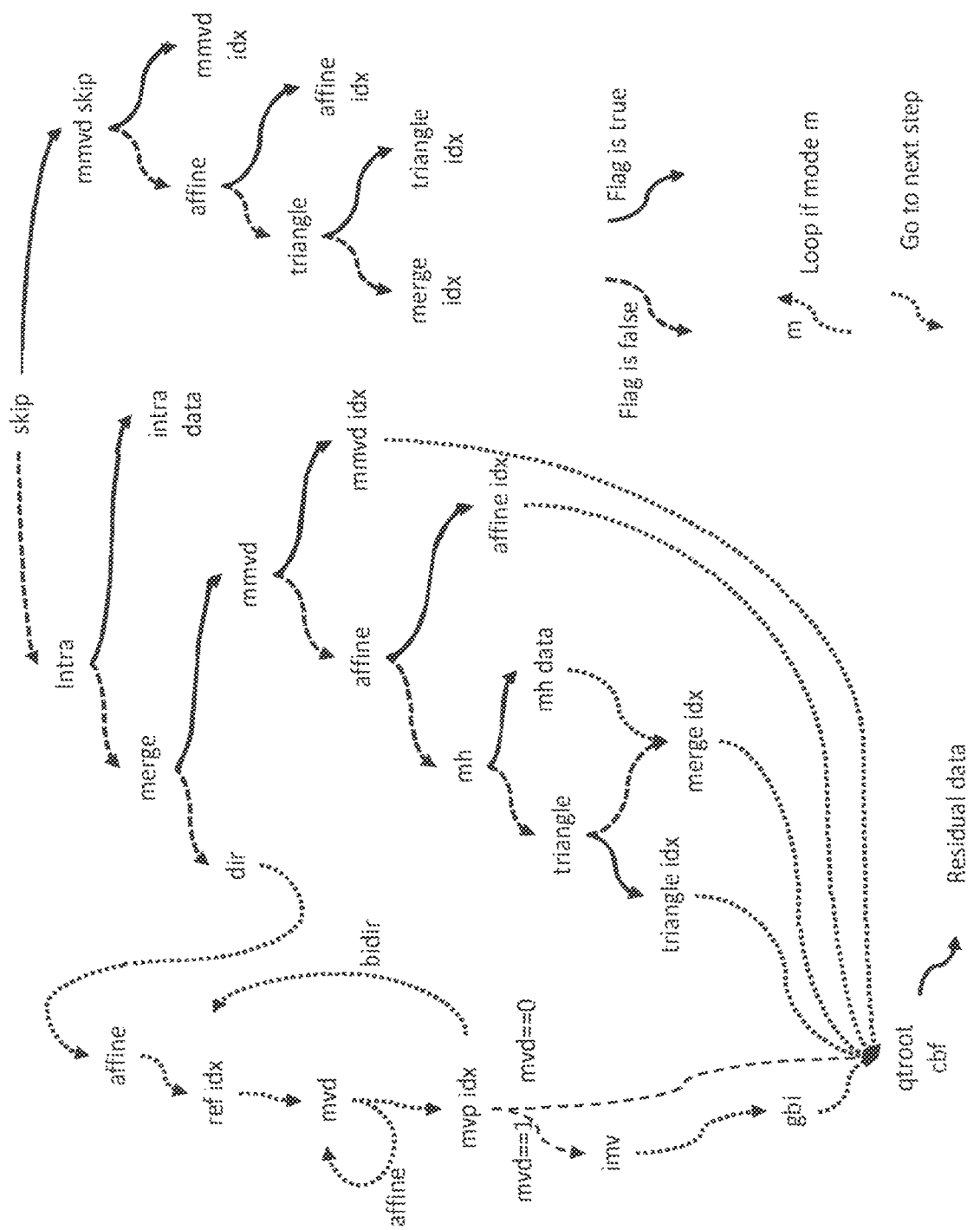
FIG. 11B illustrates a current syntax tree (non-unified).

The FIG. 11B shows the current parsing tree of the syntax currently used (not unified). The combination modes are coded sequentially in the bitstream and in an exclusive way. Moreover, not all tools are available in all modes (skip, merge, AMVP). For example, Multi-hypothesis or Triangle are not available in AMVP. It has to be noted that some tools like MMVD (Merge with Motion Vector Difference) are independent from the inter prediction mode, i.e., it could apply to merge, affine merge or triangle partitions. That is why mmvd syntax is not shown in the following proposed syntax.

DESCRIPTION

At least one embodiment relates to improving the bi-prediction syntax and process in inter coded blocks of video compression systems.

In at least one embodiment, a new syntax is proposed to support available modes related to the generalized prediction, providing:
A unified process for reconstructing generalized predictions,
A unified syntax is proposed and an extension for all modes skip, merge and AMVP,
An improved context adaptive binary arithmetic coding (CABAC) contexts thanks to the unified syntax.

Such embodiment will provide, e.g., the following advantages:
Unification of the syntax allowing a more efficient CABAC context use,
Generalization of the modes in AMVP,
Compatibility with the use of unified/consistent candidates derivation,
Unification of the syntax for cleaner specifications.

Unified Syntax

According to a first aspect, the disclosure is directed to a unified syntax for the generalized prediction process. This syntax is used by the system 1000 of FIG. 3 and more precisely by elements 145, 170, 175 of an encoder 100 according to FIG. 1 and by elements 230 and 275 of a video decoder 200 according to FIG. 2.

In at least one embodiment, a process or an apparatus for providing or utilizing a unified syntax is proposed for AMVP, merge and skip modes.

Figure 12:
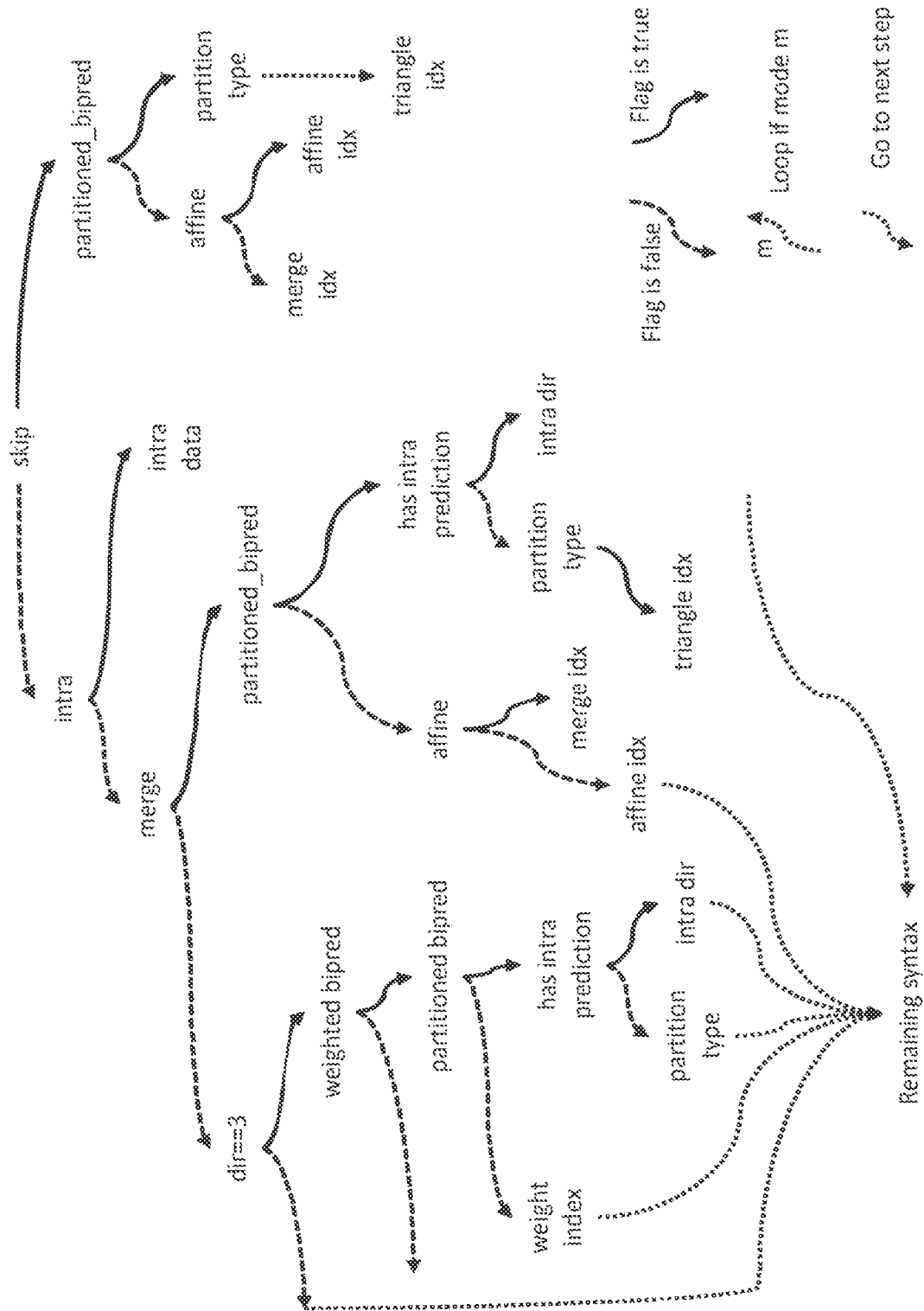
FIG. 12 illustrates an exemplary process for a unified syntax for advanced motion vector prediction (AMVP), merge and skip modes

In at least one embodiment, a process or an apparatus for providing or utilizing a unified syntax is proposed for AMVP mode, corresponding to the left part of the FIG. 12, allowing triangle and multi-hypothesis in AMVP mode:
After reading the direction flag of an AMVP CU, if the direction is 3 (corresponding to a bi-prediction block), then:
A first flag weighted_bipred is read to signal if the block will use a weighted bi-prediction or the regular (HEVC) bi-prediction. If the flag is false, the uniform mask with a weight of 0.5 are generated.
If the flag weighted_bipred is 1, the flag partitioned_bipred is read. If the flag is false, it corresponds to the GBi mode and a weight_index is decoded, corresponding to an index in the table of weights pairs.
If the flag partitioned_bipred is 1, the flag has_intra_prediction is read. If the flag is false, it corresponds to the triangle mode and a partition_type is read. For example, for a mode with only triangular partition, 0 and 1 corresponds to the left and right partitions in FIG. 5. For a mode with more partitions, the partition index is decoded.
If the flag has_intra_prediction is 1, the intra_dir value is decoded, corresponding to the intra direction of the intra part of the block. In current VTM3, only 4 directions are possible: DC, Planar, Horizontal and Vertical and are coded using 3 MPM prediction system.

Figure 13:
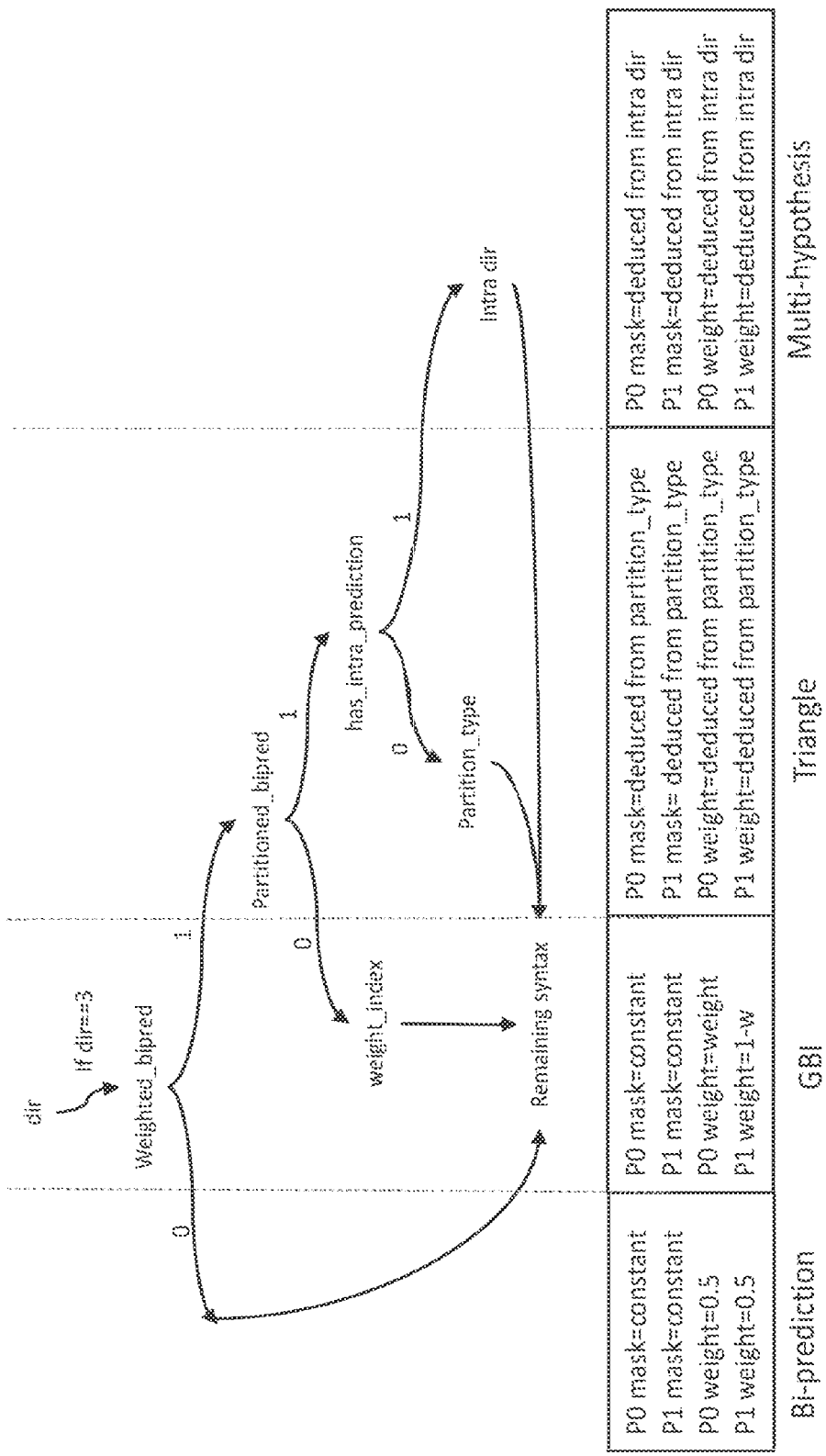
FIG. 13 illustrates an exemplary process for unified syntax and tools extension for AMVP mode.

This syntax is also illustrated in FIG. 13.

Figure 14:
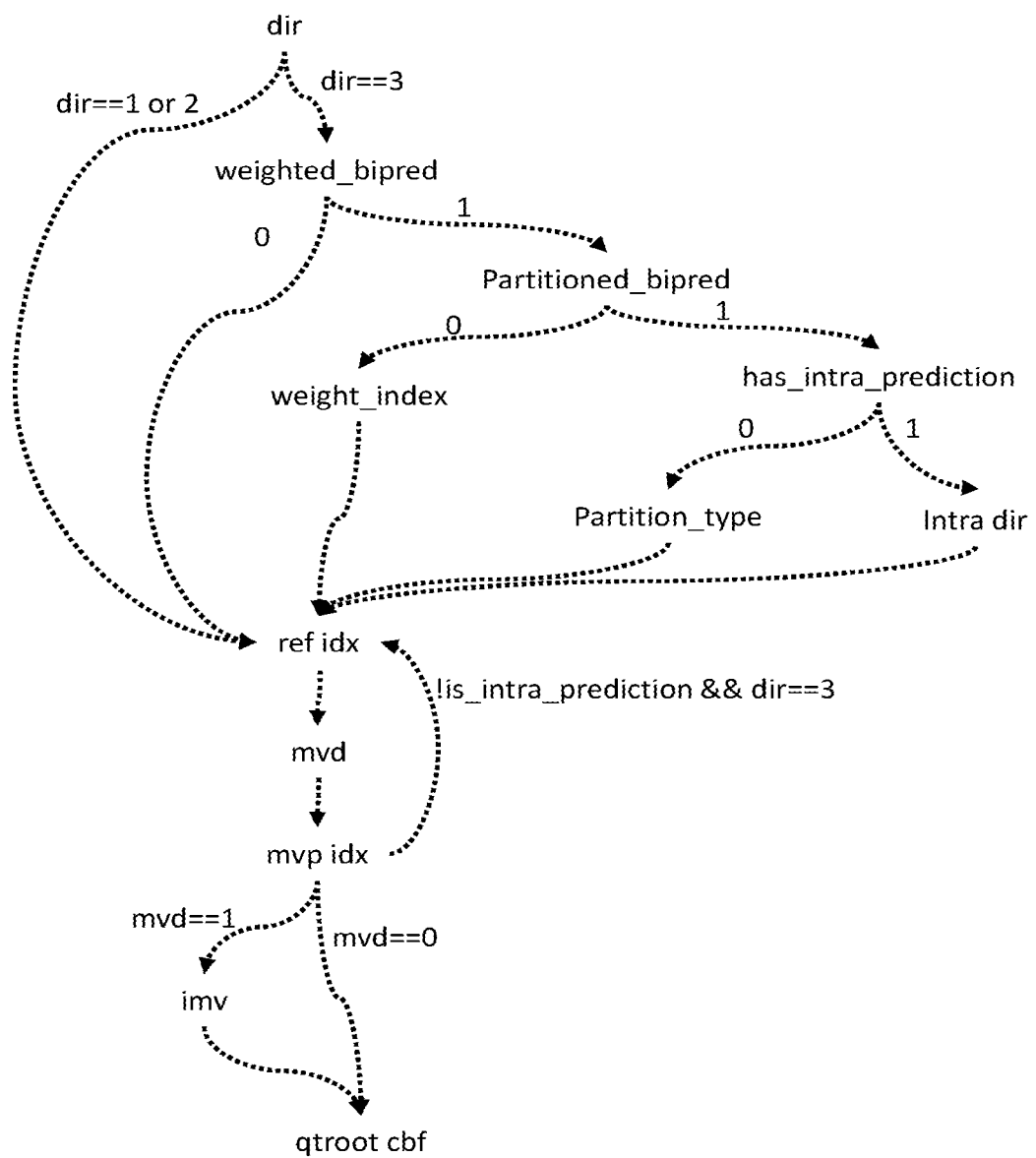
FIG. 14 illustrates an exemplary process for uni-prediction multi-hypothesis syntax.

In at least one variant embodiment, a multi-hypothesis mode is composed of a uni-prediction and an intra prediction. The decoding process is given by FIG. 14.

When a block is a bi-prediction (i.e. dir==3), then the previously described syntax is applied. In case of is_intra_prediction==1 for bi-prediction, only one motion data (ref_idx, mvd and mvp idx) are decoded.

Figure 15:
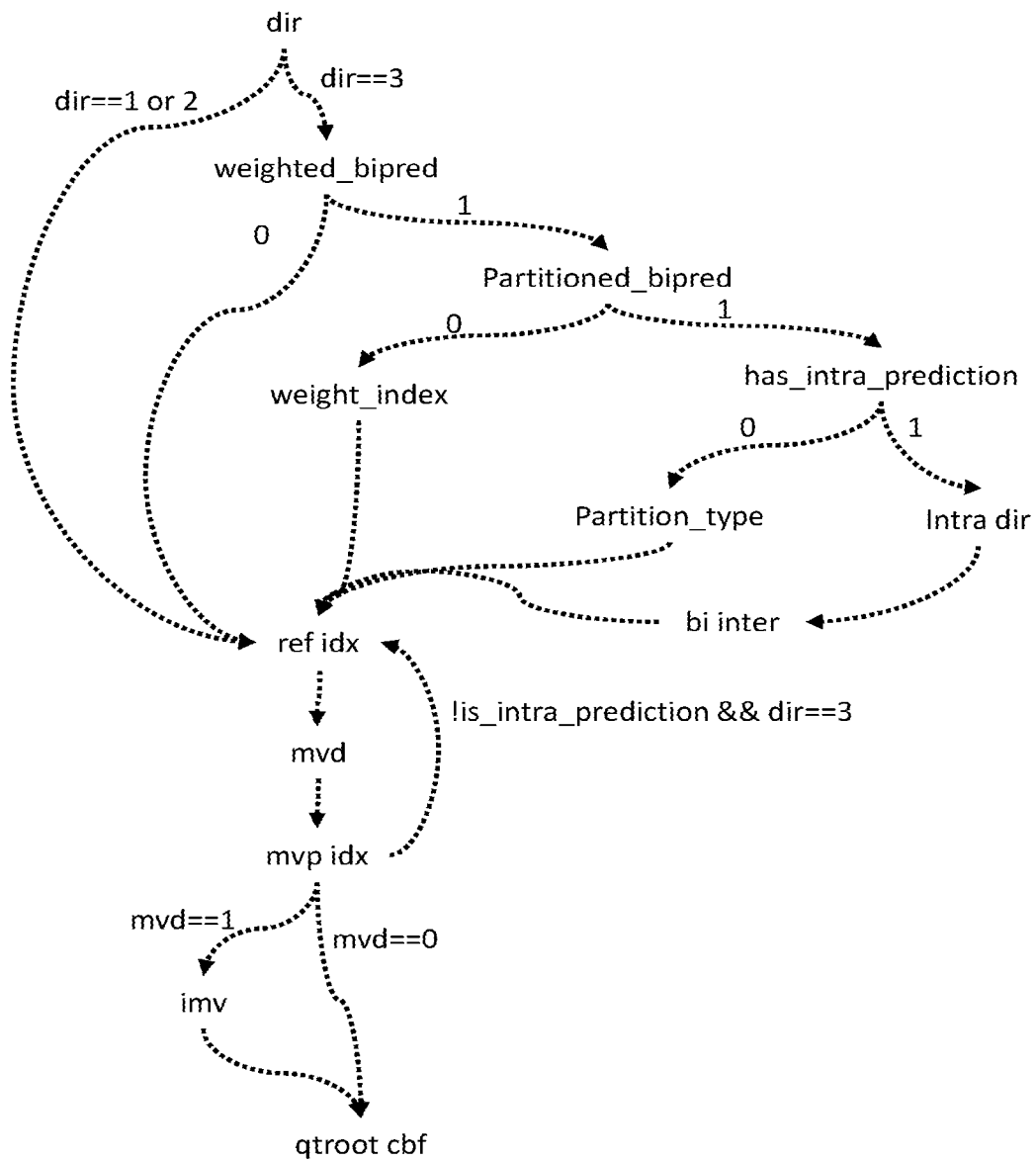
FIG. 15 illustrates another exemplary process for uni-prediction multi-hypothesis syntax.

In at least one variant embodiment, the multi-hypothesis mode can be composed of a bi-prediction and an intra prediction. The bi-prediction mode of the inter part of the prediction is signaled with the flag bi_inter. The decoding process is given by FIG. 15.

Figure 16:
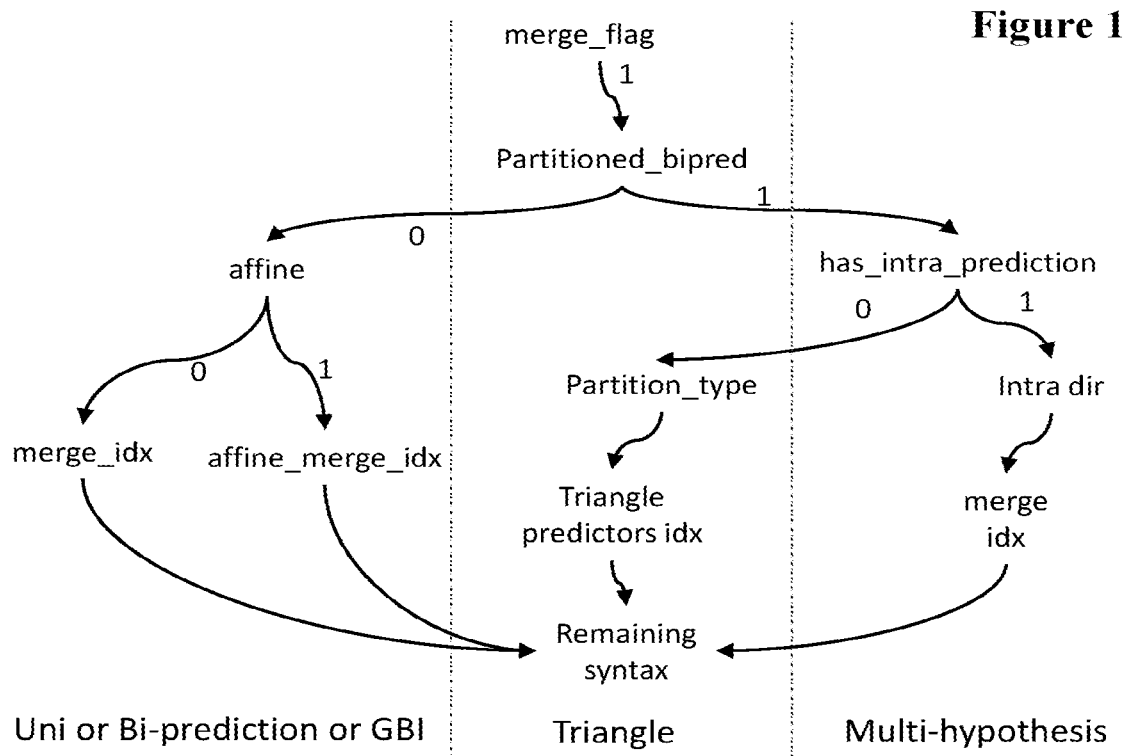
FIG. 16 illustrates an exemplary process for unified merge syntax.

In at least one embodiment, a process or an apparatus for providing or utilizing a unified syntax is proposed for merge mode, as shown in FIG. 16.

In such an embodiment:
First, the merge flag is decoded, if it is true, the flag partitioned_bipred is decoded.
If the flag partitioned_bipred is false, the regular process continues: decoding of the affine flag and the merge_idx or affine_merge_idx as before.
If the flag partitioned_bipred is true, the flag has_intra_prediction is decoded.
If the flag has_intra_prediction is false, the partition_type is decoded and then the triangle_predictors_idx (one index per predictor) following the normal process of triangle mode decoding.
If the flag has_intra_prediction is true, the intra_dir value is decoded, and the merge_idx of the inter predictor is decoded.

Note that the GBi mode is deduced from the predictor used. The prediction mode of the inter part of the multi-hypothesis mode is derived from the merge candidate decoded.

Figure 17:
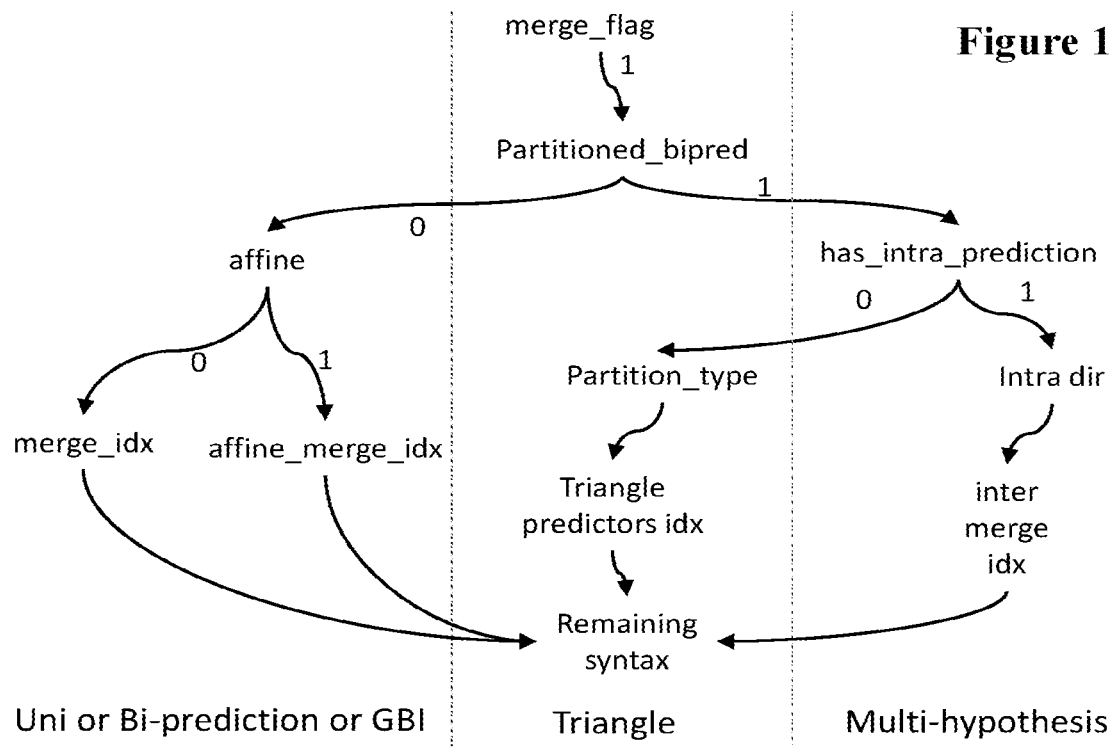
FIG. 17 illustrates another exemplary process for unified merge syntax.

In a variant embodiment, the inter part of the multi-hypothesis is assumed to be uni-prediction. In this case, the merge list derivation is different from the regular merge list derivation since there is no bi-prediction mode. The merge index of this mode is therefore signaled by a different value called inter_merge_idx in the FIG. 17.

The derivation process of the merge list in case of multi-hypothesis containing only uni prediction candidate can be shared with the triangle merge list derivation for the first list.

In at least one embodiment, a unified syntax is proposed for skip mode. In multi-hypothesis mode, because of the use of the intra mode, a residual is (almost) always coded, so the mode is removed from skip.

Figure 18:
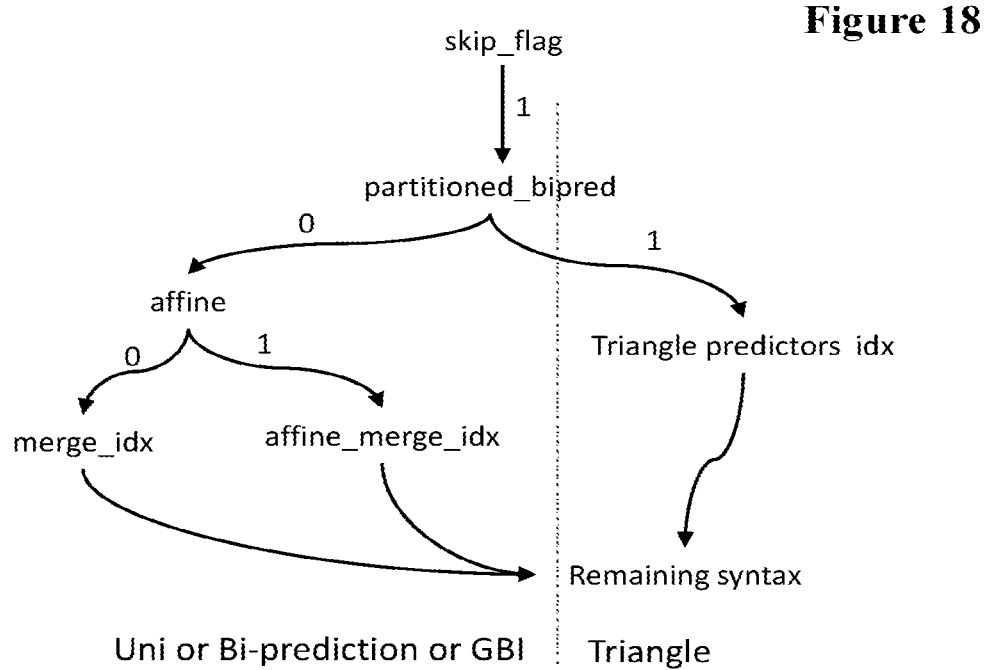
FIG. 18 illustrates an exemplary process for unified skip syntax.

FIG. 18 illustrates the parsing tree of the merge mode. In this mode:
  First the skip flag is decoded, if it is true, the flag partitioned_bipred is decoded.
  If the flag partitioned_bipred is false, the regular process continues: decoding of the affine flag and the merge_idx or affine_merge_idx as before.
  If the flag partitioned_bipred is true, the mode is assumed to be triangle and the triangle_predictors_idx (one index per predictor) is decoded, following the normal process of triangle mode decoding.

Unified Process

Figure 19:
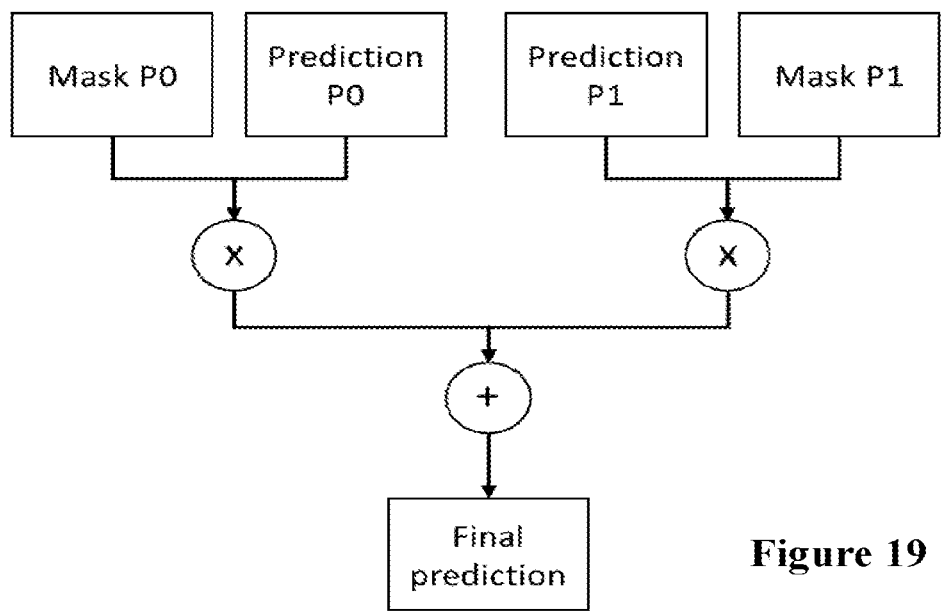
FIG. 19 illustrates a generalized process of combination using masks.

According to another aspect, the disclosure is directed to a unified process of generalized prediction, illustrated in FIG. 19. This process is implemented in the system 1000 of FIG. 3 and more precisely in elements 145, 170, 175 of an encoder 100 according to FIG. 1 and in elements 230 and 275 of a video decoder 200 according to FIG. 2.

Figure 6:
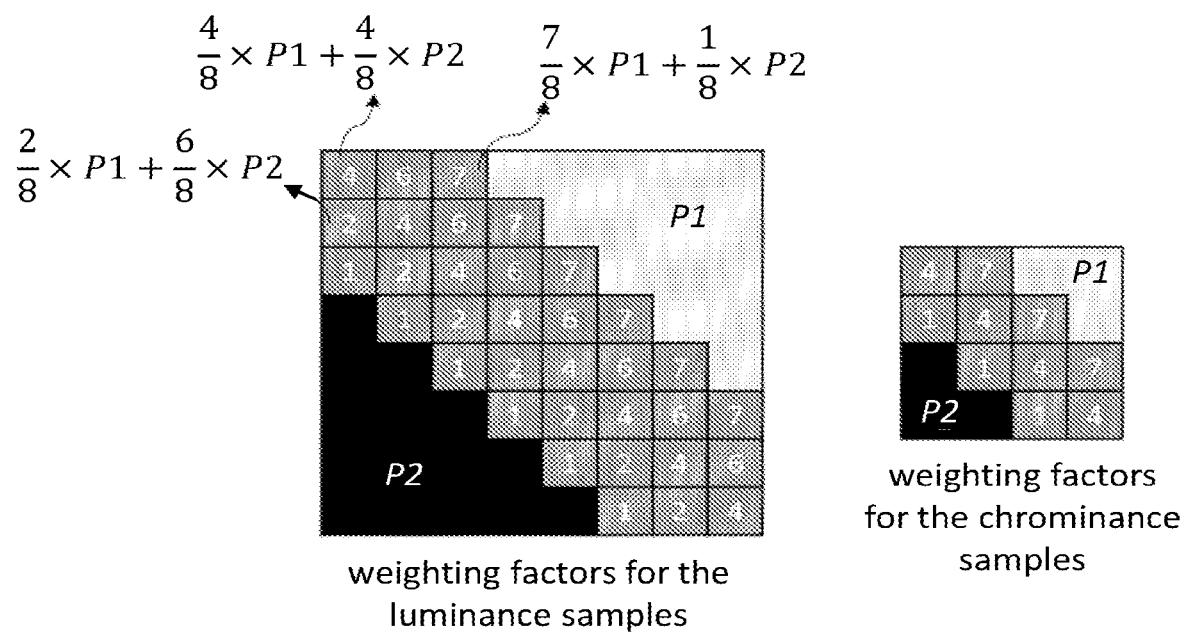
FIG. 6 illustrates a weighting process on a diagonal edge between two triangular prediction units.

In at least an embodiment:
  For each prediction 0 and 1, a mask is created. The sum of the mask values at each location in the mask is 1.0 by construction.
  The prediction samples are then multiplied by the mask.
  The 2 multiplied prediction are added.
  The creation of the mask is as follow:

For bi-prediction mode, the mask is uniform and of value 0.5.
  For GBi mode, the mask is uniform, and the value of each mask is the value of the GBi weights, for example prediction 0 has a uniform mask of value ¼ while prediction 1 as a uniform mask of value ¾.
  For multi-hypothesis mode, the mask is non-uniform and created as described in FIG. 8 by the multi-hypothesis process. This mask depends on the intra prediction.
  For Triangle mode, the mask is non-uniform and created as described in FIG. 6 by the triangle modes. The mask depends on the triangle partition mode.

Figure 20:
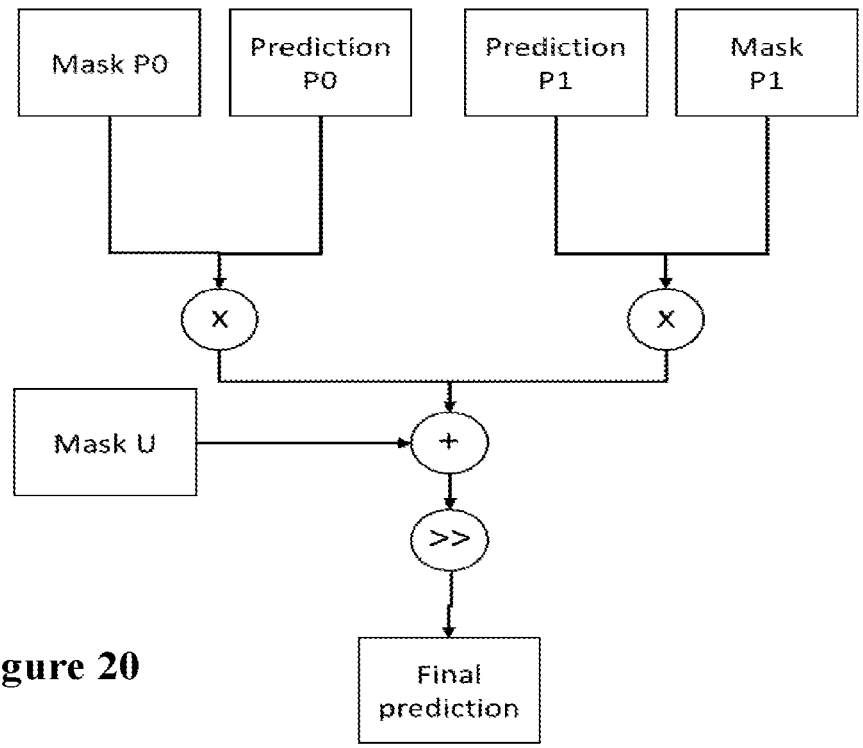
FIG. 20 illustrates a generalized process using shifting.

In a variant embodiment, the combination process is done using bit shifting operations as described in FIG. 20. We assume a bit depth of N (typically N=3+1 bit for the sign) for the coding of the mask.

In FIG. 20, the» sign represents the right arithmetic shift by N, the mask U is a uniform mask containing the value (1«(N−1) and the "X" are done using internal bit depth accuracy M (with M>N).

For a mask bit-depth of N, the above masks values are then:
  For a bi-prediction, the mask is uniformly equal to (1« (N−1).
  For a GBi mode, the mask is uniform, and the value of each mask is the value of the GBi weights, for example prediction 0 has a uniform mask of value 2 (corresponding to ¼ if N=3) while prediction 1 as a uniform mask of value 6 (corresponding to ¾ if N=3).
  For Multi-hypothesis mode, the mask is non-uniform and created as described in FIG. 8 by the multi-hypothesis process.
  For Triangle mode, the mask is non-uniform and created as described in FIG. 6 by the triangle modes. The value in the mask are derived from the weights.

Syntax

The proposed syntax elements are described in the table below.

```
coding_unit( x0, y0, cbWidth, cbHeight, treeType ) {
  if( slice_type != I ) {
    cu_skip_flag[ x0 ][ y0 ] {
    if( cu_skip_flag[ x0 ][ y0 ] = = 0 )
      pred_mode_flag
    }
  }
  if( CuPredMode[ x0 ][ y0 ] = = MODE_INTRA ) {
    if( treeType = = SINGLE_TREE | | treeType = = DUAL_TREE_LUMA ) {
      if( ( y0 % CtbSizeY ) > 0 )
        intra_luma_ref_idx[ x0 ][ y0 ]
      if (intra_luma_ref_idx[ x0 ][ y0 ] = = 0)
        intra_luma_mpm_flag[ x0 ][ y0 ]
      if( intra_luma_mpm_flag[ x0 ][ y0 ] )
        intra_luma_mpm_idx[ x0 ][ y0 ]
      else
        intra_luma_mpm_remainder[ x0 ][ y0 ]
      if( treeType = = SINGLE_TREE | | treeType = = DUAL_TREE_CHROMA )
        intra_chroma_pred_mode[ x0 ][ y0 ]
    }
  } else { /* MODE_INTER */
    if( !cu_skip_flag[ x0 ][ y0 ] ) {
      merge_flag[ x0 ][ y0 ]
    }
    if( merge_flag[ x0 ][ y0 ] ) {
      Partitioned_bipred_flag
      if( Partitioned_bipred_flag[ x0 ][ y0 ] ) {
        if(( !cu_skip_flag[ x0 ][ y0 ] )
          Has_intra_prediction_flag
        if(( Has_intra_prediction_flag[ x0 ][ y0 ] ){
          Intra_direction
        } else {
          Partition_type_flag
```

-continued

```
            Triangle_idx
        }
    } else {
        Merge_affine_flag
    }
    if( merge_affine_flag[ x0 ][ y0 ] = = 0 && MaxNumMergeCand > 1 )
        merge_idx[ x0 ][ y0 ]
    if( merge_affine_flag[ x0 ][ y0 ] = = 1 && MaxNumMergeCandAffine > 1 )
        Merge_affine_idx[ x0 ][ y0 ]
} else {
    if( slice_type = = B )
        inter_pred_idc[ x0 ][ y0 ]
        if ( inter_pred_idc[ x0 ][ y0 ] = = PRED_BI) {
            Weighted_bipred
            if( Weighted_bipred[ x0 ][ y0 ] ) {
                Partitioned_bipred
            }
            if( Partitioned_bipred[ x0 ][ y0 ]) {
                Has_intra_prediction_flag
                if( Has_intra_prediction_flag [ x0 ][ y0 ] ){
                    Intra_direction
                } else {
                    Partition_type_flag
                } else {
                Weight_index
                }
            }
        }
        if( inter_pred_idc[ x0 ][ y0 ] != PRED_L1 ) {
            if( num_ref_idx_l0_active_minus1 > 0 )
                ref_idx_l0[ x0 ][ y0 ]
            mvd_coding( x0, y0, 0, 0 )
            if( MotionModelIdc[ x0 ][ y0 ] > 0
                mvd_coding( x0, y0, 0, 1 )
            if(MotionModelIdc[ x0 ][ y0 ] > 1 )
                mvd_coding( x0, y0, 0, 2 )
            mvp_l0_flag[ x0 ][ y0 ]
        } else {
            MvdL0[ x0 ][ y0 ][ 0 ] = 0
            MvdL0[ x0 ][ y0 ][ 1 ] = 0
        }
        if( inter_pred_idc[ x0 ][ y0 ] != PRED_L0 ) {
            if( num_ref_idx_l1_active_minus1 > 0 )
                ref_idx_l1[ x0 ][ y0 ]
            if( mvd_l1_zero_flag && inter_pred_idc[ x0 ][ y0 ] = = PRED_BI ) {
                MvdL1[ x0 ][ y0 ][ 0 ] = 0
                MvdL1[ x0 ][ y0 ][ 1 ] = 0
                MvdCpL1[ x0 ][ y0 ][ 0 ][ 0 ] = 0
                MvdCpL1[ x0 ][ y0 ][ 0 ][ 1 ] = 0
                MvdCpL1[ x0 ][ y0 ][ 1 ][ 0 ] = 0
                MvdCpL1[ x0 ][ y0 ][ 1 ][ 1 ] = 0
                MvdCpL1[ x0 ][ y0 ][ 2 ][ 0 ] = 0
                MvdCpL1[ x0 ][ y0 ][ 2 ][ 1 ] = 0
            } else {
                mvd_coding( x0, y0, 1, 0 )
                if( MotionModelIdc[ x0 ][ y0 ] > 0 )
                    mvd_coding( x0, y0, 1, 1 )
                if(MotionModelIdc[ x0 ][ y0 ] > 1 )
                    mvd_coding( x0, y0, 1, 2 )
                mvp_l1_flag[ x0 ][ y0 ]
            } else {
                MvdL1[ x0 ][ y0 ][ 0 ] = 0
                MvdL1[ x0 ][ y0 ][ 1 ] = 0
            }
            if( sps_amvr_enabled_flag && inter_affine_flag = = 0 &&
                ( MvdL0[ x0 ][ y0 ][ 0 ] != 0 | | MvdL0[ x0 ][ y0 ][ 1 ] != 0 | |
                MvdL1[ x0 ][ y0 ][ 0 ] != 0 | | MvdL1[ x0 ][ y0 ][ 1 ] != 0 ) )
                amvr_mode[ x0 ][ y0 ]
            if(inter_pred_idc[ x0 ][ y0 ] == PRED_BI)
                gbi_flag
        }
    }
}
```

```
if( !pcm_flag[ x0 ][ y0 ] ) {
   if( CuPredMode[ x0 ][ y0 ] != MODE_INTRA && cu_skip_flag[ x0 ][ y0 ] = = 0 )
      cu_cbf
   if( cu_cbf )
      transform_tree( x0, y0, cbWidth, cbHeight, treeType )
   }
}
```

The semantics of some elements of the syntax are described as follows:

Partitioned_bipred [x0] [y0] equal to 1 specifies that for the current coding unit, the weighting process of the two predictions P0 and P1 is done by using at least two different weights for all the samples. If the flag is equal to 0, only one weight is used.

Partition_type [x0] [y0] specifies the partition used to split the current coding unit into 2 prediction units of the block where x0, y0 specify the location (x0, y0) of the top-left luma sample of the considered prediction block relative to the top-left luma sample of the picture.

Weighted_bipred [x0] [y0] equal to 1 specifies that the only weight used for the weighting of the 2 predictions is not ½. If the flag is equal to 0, ½ weight is used.

Has_intra_prediction [x0] [y0] specifies that the current inter prediction of the current coding unit will be weighted with an intra prediction.

CABAC Context Coding

By unifying the generalized prediction, more efficient CABAC context can be used for the following flags:

partitioned bipred: context on neighboring blocks being triangle or multi-hypothesis mode.

has_intra_prediction: context on neighboring blocks being triangle.

weighted_bipred: context on neighboring blocks being GBi, triangle or multi-hypothesis mode.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the processes presented in FIGS. 4 and 8.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the process of FIGS. 4 and 8.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular mode. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

A unified process of generalized inter prediction uses a unified syntax for video encoding and video decoding comprising different modes combined together according corresponding weights, the combination being either two inter prediction modes or an inter prediction mode combined with an intra mode.

A video encoding method uses a unified process for handling a generalized inter prediction using a unified syntax for video encoding and video decoding comprising different modes combined together according corresponding weights, the combination being either two inter prediction modes or an inter prediction mode combined with an intra mode.

A video decoding method uses a unified process for handling a generalized inter prediction using a unified syntax for video encoding and video decoding comprising different modes combined together according corresponding weights, the combination being either two inter prediction modes or an inter prediction mode combined with an intra mode.

A video encoder, transcoder or other electronic device performs video encoding using a unified process for handling a generalized inter prediction using a unified syntax for video encoding and video decoding comprising different modes combined together according corresponding weights, the combination being either two inter prediction modes or an inter prediction mode combined with an intra mode.

A TV, set-top box, cell phone, tablet, or other electronic device performs video decoding using a unified process for handling a generalized inter prediction using a unified syntax for video encoding and video decoding comprising different modes combined together according corresponding weights, the combination being either two inter prediction modes or an inter prediction mode combined with an intra mode.

The invention claimed is:

1. A method for video decoding, comprising:
   obtaining video data representative of an image block to be decoded; and
   decoding the image block from the obtained video data;
   wherein, in a case where bi-prediction applies to the image block with motion vector prediction, decoding comprises decoding a first flag that indicates whether weighted bi-prediction applies to the image block and, in the case where the first flag indicates weighted bi-prediction applies, decoding a second flag that indicates whether weighted bi-prediction is done by using at least two different weights inside the image block, and otherwise applying regular bi-prediction to the image block;
   in a case where the second flag indicates weighted bi-prediction is done by using at least two different weights inside the image block, decoding comprises decoding a third flag that indicates whether inter prediction is combined with intra prediction and, otherwise, decoding an index in a table of weights pairs and applying generalized bi-prediction to the image block responsive to the weights pair indexed by the index; and in a case where the third flag indicates inter prediction combined with intra prediction, decoding comprises decoding an intra direction and applying multi-hypothesis prediction to the image block responsive to the intra direction, and, otherwise, decoding a partition type and applying triangle prediction to the image block responsive to the partition type.

2. The method of claim 1, wherein, in the case where merge mode applies to the image block, decoding comprises decoding the second flag and, in the case where the second flag indicates weighted bi-prediction is done by using at least two different weights inside the image block decoding the third flag that indicates whether inter prediction is combined with intra prediction and, otherwise, decoding a fourth flag that indicates whether affine merge applies and decoding merge or affine merge indices responsive to a value of the fourth flag, and wherein, in the case where third flag indicates inter prediction is combined with intra prediction, decoding an intra direction and a merge index for an inter predictor and applying multi-hypothesis prediction to the image block responsive to the intra direction and merge index and, otherwise, decoding a partition type and triangle predictors indices and applying a triangle prediction to the image block responsive to the partition type and triangle predictors indices.

3. The method of claim 1, wherein, in the case where skip mode applies to the image block, decoding comprises decoding the second flag and, in the case where the second flag indicates weighted bi-prediction is done by using at least two different weights inside the image block, decoding triangle predictors indices and applying triangle prediction to the image block responsive to the triangle predictors indices and, otherwise, decoding a fourth flag that indicates whether affine merge applies and decoding merge or affine merge indices responsive to a value of the fourth flag.

4. The method of claim 1, wherein, in context adaptive binary arithmetic coding, a context for the first flag is based on neighboring blocks decoded using generalized bi-prediction, triangle prediction, or multi-hypothesis prediction, a context for the second flag is based on neighboring blocks decoded using triangle prediction or multi-hypothesis prediction, and a context for the third flag is based on neighboring blocks decoded using triangle prediction.

5. An apparatus for video decoding, comprising one or more processors, wherein the one or more processors are configured to implement:
obtaining video data representative of an image block to be decoded; and
decoding the image block from the obtained video data;
wherein, in case where bi-prediction applies to the image block with motion vector prediction, the decoding comprises to decoding a first flag that indicates whether weighted bi-prediction applies to the image block and, in the case where the first flag indicates weighted bi-prediction applies, decoding a second flag that indicates whether weighted bi-prediction is done by using at least two different weights inside the image block, and otherwise applying regular bi-prediction to the image block;
in a case where the second flag indicates weighted bi-prediction is done by using at least two different weights inside the image block, decoding comprises decoding a third flag that indicates whether inter prediction is combined with intra prediction and, otherwise, decoding an index in a table of weights pairs and applying generalized bi-prediction to the image block responsive to the weights pair indexed by the index; and in a case where the third flag indicates inter prediction combined with intra prediction, decoding comprises decoding an intra direction and applying multi-hypothesis prediction to the image block responsive to the intra direction, and, otherwise, decoding a partition type and applying triangle prediction to the image block responsive to the partition type.

6. The apparatus of claim 5, wherein, in the case where merge mode applies to the image block, decoding comprises decoding the second flag and, in the case where the second flag indicates weighted bi-prediction is done by using at least two different weights inside the image block, decoding the third flag that indicates whether inter prediction is combined with intra prediction and, otherwise, decoding a fourth flag that indicates whether affine merge applies and decoding merge or affine merge indices responsive to a value of the fourth flag, and wherein, in the case where third flag indicates inter prediction is combined with intra prediction, decoding an intra direction and a merge index for an inter predictor and applying multi-hypothesis prediction to the image block responsive to the intra direction and merge index and, otherwise, to decoding a partition type and triangle predictors indices and applying a triangle prediction to the image block responsive to the partition type and triangle predictors indices.

7. The apparatus of claim 5, wherein, in the case where skip mode applies to the image block, decoding comprises decoding the second flag and, in the case where the second flag indicates weighted bi-prediction is done by using at least two different weights inside the image block, decoding triangle predictors indices and applying triangle prediction to the image block responsive to the triangle predictors indices and, otherwise, decoding a fourth flag that indicates whether affine merge applies and decoding merge or affine merge indices responsive to a value of the fourth flag.

8. The apparatus of claim 5, wherein, in context adaptive binary arithmetic coding, a context for the first flag is based on neighboring blocks decoded using generalized bi-prediction, triangle prediction, or multi-hypothesis prediction, a context for the second flag is based on neighboring blocks decoded using triangle prediction or multi-hypothesis prediction, and a context for the third flag is based on neighboring blocks decoded using triangle prediction.

9. A method for video encoding, comprising:
obtaining an image block to be encoded; and
encoding the image block into encoded data;
wherein, in case where bi-prediction applies to the image block with motion vector prediction, encoding comprises encoding a first flag that indicates whether weighted bi-prediction applies to the image block and, in the case where the first flag indicates weighted bi-prediction applies, encoding a second flag that indicates whether weighted bi-prediction is done by using at least two different weights inside the image block, and otherwise applying regular bi-prediction to the image block;
in a case where the second flag indicates weighted bi-prediction is done by using at least two different weights inside the image block, encoding comprises encoding a third flag that indicates whether inter prediction is combined with intra prediction and, otherwise, encoding an index in a table of weights pairs and applying generalized bi-prediction to the image block responsive to the weights pair indexed by the index; and in a case where the third flag indicates inter prediction combined with intra prediction, encoding comprises encoding an intra direction and applying multi-hypothesis prediction to the image block responsive to the intra direction, and, otherwise, encoding a partition type and applying triangle prediction to the image block responsive to the partition type.

10. The method of claim 9, wherein, in the case where merge mode applies to the image block, encoding comprises encoding the second flag and, in the case where the second flag indicates weighted bi-prediction is done by using at least two different weights inside the image block, encoding the third flag that indicates whether inter prediction is combined with intra prediction and, otherwise, encoding a fourth flag that indicates whether affine merge applies and encoding merge or affine merge indices responsive to a value of the fourth flag, and wherein, in the case where third flag indicates inter prediction is combined with intra prediction, encoding an intra direction and a merge index for an inter predictor and applying multi-hypothesis prediction to the image block responsive to the intra direction and merge index and, otherwise, encoding a partition type and triangle predictors indices and applying a triangle prediction to the image block responsive to the partition type and triangle predictors indices.

11. The method of claim 9, wherein, in the case where skip mode applies to the image block, encoding comprises encoding the second flag and, in the case where the second flag indicates weighted bi-prediction is done by using at least two different weights inside the image block, encoding triangle predictors indices and applying triangle prediction to the image block responsive to the triangle predictors indices and, otherwise, encoding a fourth flag that indicates whether affine merge applies and encoding merge or affine merge indices responsive to a value of the fourth flag.

12. The method of claim 9, wherein, in context adaptive binary arithmetic coding, a context for the first flag is based on neighboring blocks encoded using generalized bi-prediction, triangle prediction, or multi-hypothesis prediction, a context for the second flag is based on neighboring blocks encoded using triangle prediction or multi-hypothesis prediction, and a context for the third flag is based on neighboring blocks encoded using triangle prediction.

13. An apparatus for video encoding, comprising one or more processors, wherein the one or more processors are configured to implement:

obtaining an image block to be encoded; and
encoding the image block into encoded data;
wherein, in case where bi-prediction applies to the image block with motion vector prediction, the encoding comprises encoding a first flag that indicates whether weighted bi-prediction applies to the image block and, in the case where the first flag indicates weighted bi-prediction applies, encoding a second flag that indicates whether weighted bi-prediction is done by using at least two different weights inside the image block, and otherwise applying regular bi-prediction to the image block;

in a case where the second flag indicates weighted bi-prediction is done by using at least two different weights inside the image block, encoding encoding a third flag that indicates whether inter prediction is combined with intra prediction and, otherwise, encoding an index in a table of weights pairs and applying generalized bi-prediction to the image block responsive to the weights pair indexed by the index; and in a case where the third flag indicates inter prediction combined with intra prediction, encoding comprises encoding an intra direction and applying multi-hypothesis prediction to the image block responsive to the intra direction, and, otherwise, encoding a partition type and applying triangle prediction to the image block responsive to the partition type.

14. The apparatus of claim 13, wherein, in the case where merge mode applies to the image block, encoding comprises encoding the second flag and, in the case where the second flag indicates weighted bi-prediction is done by using at least two different weights inside the image block, encoding the third flag that indicates whether inter prediction is combined with intra prediction and, otherwise, encoding a fourth flag that indicates whether affine merge applies and encoding merge or affine merge indices responsive to a value of the fourth flag, and wherein, in the case where third flag indicates inter prediction is combined with intra prediction, encoding an intra direction and a merge index for an inter predictor and applying multi-hypothesis prediction to the image block responsive to the intra direction and merge index and, otherwise, encoding a partition type and triangle predictors indices and applying a triangle prediction to the image block responsive to the partition type and triangle predictors indices.

15. The apparatus of claim 13, wherein, in the case where skip mode applies to the image block, encoding comprises encoding the second flag and, in the case where the second flag indicates weighted bi-prediction is done by using at least two different weights inside the image block, encoding triangle predictors indices and applying triangle prediction to the image block responsive to the triangle predictors indices and, otherwise, encoding a fourth flag that indicates whether affine merge applies and encoding merge or affine merge indices responsive to a value of the fourth flag.

16. The apparatus of claim 13, wherein, in context adaptive binary arithmetic coding, a context for the first flag is based on neighboring blocks encoded using generalized bi-prediction, triangle prediction, or multi-hypothesis prediction, a context for the second flag is based on neighboring blocks encoded using triangle prediction or multi-hypothesis prediction and a context for the third flag is based on neighboring blocks encoded using triangle prediction.

17. The method of claim 1, wherein applying multi-hypothesis prediction comprises combining an inter uni-prediction and an intra prediction or combining an inter bi-prediction and an intra prediction.

18. The method of claim 2, wherein applying multi-hypothesis prediction comprises combining an inter uni-prediction and an intra prediction, a merge index being signaled for the inter uni-prediction.

19. The apparatus of claim 5, wherein applying multi-hypothesis prediction comprises combining an inter uni-prediction and an intra prediction or combining an inter bi-prediction and an intra prediction.

20. The apparatus of claim 6, wherein applying multi-hypothesis prediction comprises combining an inter uni-prediction and an intra prediction, a merge index being signaled for the inter uni-prediction.

21. The method of claim 9, wherein applying multi-hypothesis prediction comprises combining an inter uni-prediction and an intra prediction or combining an inter bi-prediction and an intra prediction.

22. The method of claim 10, wherein applying multi-hypothesis prediction comprises combining an inter uni-prediction and an intra prediction, a merge index being signaled for the inter uni-prediction.

23. The apparatus of claim 13, wherein applying multi-hypothesis prediction comprises combining an inter uni-prediction and an intra prediction or combining an inter bi-prediction and an intra prediction.

24. The apparatus of claim 14, wherein applying multi-hypothesis prediction comprises combining an inter uni-prediction and an intra prediction, a merge index being signaled for the inter uni-prediction.

* * * * *

UNITED STATES PATENT AND TRADEMARK OFFICE
CERTIFICATE OF CORRECTION

PATENT NO. : 12,149,731 B2
APPLICATION NO. : 18/100667
DATED : November 19, 2024
INVENTOR(S) : Galpin et al.

Page 1 of 1

It is certified that error appears in the above-identified patent and that said Letters Patent is hereby corrected as shown below:

In the Claims

Claim 5, Column 21, Line 55: delete "the"

Claim 5, Column 21, Line 56: delete "to"

Claim 6, Column 22, Line 27: delete "to"

Claim 13, Column 23, Line 53: delete "the"

Signed and Sealed this
Twenty-fifth Day of February, 2025

Coke Morgan Stewart
*Acting Director of the United States Patent and Trademark Office*